United States Patent [19]

Snodell

[11] Patent Number: 4,928,914

[45] Date of Patent: May 29, 1990

[54] TILTABLE MOUNTING BRACKET

[75] Inventor: W. S. Snodell, Glen Ellyn, Ill.

[73] Assignee: Peerless Industries, Inc., Melrose Park, Ill.

[21] Appl. No.: 312,202

[22] Filed: Feb. 21, 1989

[51] Int. Cl.⁵ .............................................. E04G 3/00
[52] U.S. Cl. ................................... 248/274; 248/291; 248/323
[58] Field of Search ............... 248/274, 276, 284, 285, 248/291, 310, 371, 397, 201, 323, 324, 359 H, 278, 279, 184, 178

[56] References Cited

U.S. PATENT DOCUMENTS

| | | | |
|---|---|---|---|
| 2,500,048 | 3/1950 | Stoiber | 248/184 |
| 3,520,564 | 7/1970 | Peterson | 403/396 |
| 4,318,522 | 3/1982 | Appleberry | 248/178 |
| 4,712,313 | 12/1987 | Gettleman | 248/284 X |

FOREIGN PATENT DOCUMENTS 0417366 1/1947 Italy .................................. 403/396

Primary Examiner—Ramon O. Ramirez
Attorney, Agent, or Firm—Martin Faier

[57] ABSTRACT

A tiltable mounting bracket for adjustably securing a speaker or other appliance on a wall or ceiling which has two similar plates, one for securing the bracket to the wall or ceiling and the other for securing the speaker or other appliance to the bracket, and a U-shaped member adjustably connecting the plates, each of the plates having a track for adjustably securing the U-shaped member thereon, and means associated with each track for adjustably securing the plates in an adjusted position relative to one another. The invention also includes parallel sets of arcuate and straight portions of the U-shaped member for reinforced adjustable securement of the plates relative to one another, and exit means through the plates permitting wires to pass therethrough.

18 Claims, 1 Drawing Sheet

TILTABLE MOUNTING BRACKET

BACKGROUND AND SUMMARY OF THE INVENTION

This invention related to mounting brackets, and is particularly directed to a mounting bracket for securing a speaker or appliance to a wall or ceiling.

Most mounting brackets used for securing a speaker or appliance to a surface are of a yoke or plate design where one plate is joined to the mounting surface and the another plate or yoke is joined to the appliance. The joinder of the plates or plate and yoke is usually through a ball or swivel joint which must be of considerable relative strength to carry the designated load. Sometimes, articulation of the appliance relative to the underlying wall or plate is in an arc running in a single plane, and such an arrangement not only affects the relationship of the appliance to its user (for example, a speaker sometimes cannot be suitably adjusted for head-on hearing, depending upon the position of the wall or the listener), but also the adjustability of the mounting system.

Prior art systems are often complicated in their design and difficult to manufacture. In a bracket embodying the present invention, the portion of the device which secures the mounting bracket to a wall or ceiling it identical to that portion of the device to which is secured the appliance. A unitary tubular structure of substantial inherent strength connects these portions together and provides the articulation between the portions. Additionally, the shape and arrangement of the parts not only provides stability to the assembly, but also reinforces the structure to maximize the ability of the combined elements to suitably carry applied loads.

Frequently, when used to mount electronic equipment, such as a speaker or a video camera or the like, prior art mounting brackets offer no suitable means for handling of wires exiting from the equipment, sometimes resulting in severing the wires or providing an ugly "spaghetti" mess of wires. A preferred embodiment of the present invention has built-in means through the bracket for exiting of wires without necessity of special tubes or the like.

OBJECTS AND ADVANTAGES OF THE INVENTION

It is the object of the present invention to provide a tiltable mounting bracket of the character described.

Another object is to provide such a mounting bracket which permits articulation of the bracket in both horizontal and vertical places while being secured to an underlying mounting surface and having an appliance secured to the mounting bracket.

Another object is to provide a tiltable mounting bracket for an appliance which has like interchangeable parts for securing it to a mounting surface and for securing the appliance to the mounting bracket.

Another object is to provide a tiltable mounting bracket for securing an appliance to a mounting surface wherein the appliance is tiltable in horizontal and vertical planes.

Another object is to provide a tiltable mounting bracket for securing an appliance to a mounting surface wherein like portions are provided for securing the bracket to a mounting surface and for securing the appliance to the bracket, wherein a tubular member connects the portions for articulating one portion relative to the other portion.

Another object is to provide a member for a tiltable mounting bracket having a U-shape in both a horizontal and vertical plane for tilting a portion of the bracket holding an appliance relative to a portion of the bracket secured to a mounting surface.

Another object is to provide a tiltable mounting bracket for mounting an appliance on a mounting surface which has means for accommodating wires exiting from the appliance through the bracket.

Another object is to provide reinforced means for horizontal and vertical tilting of portions of a mounting bracket relative to one another.

Another object is to provide a tiltable mounting bracket which is simple and inexpensive to manufacture and easy to assemble and use.

DESCRIPTION OF A PREFERRED EMBODIMENT

Figure 1:
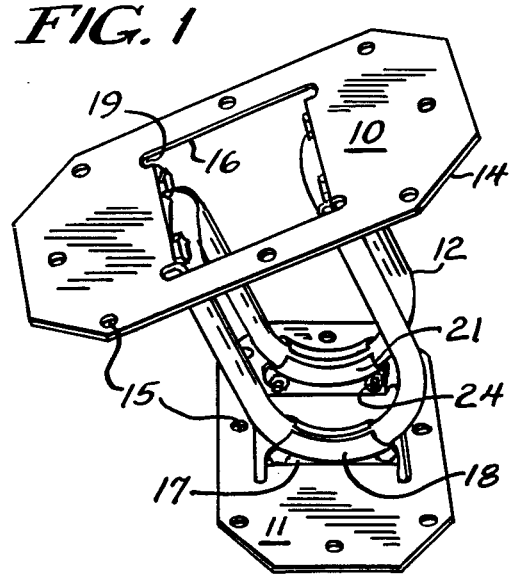
FIG. 1 is a perspective view showing an assembled novel mounting bracket embodying the invention.
Figure 2:
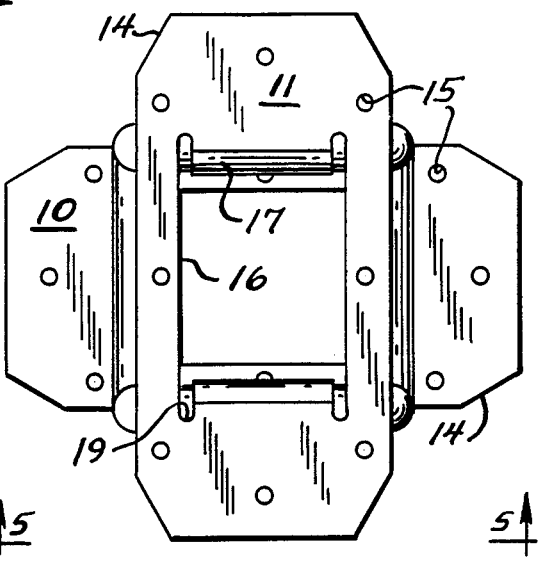
FIG. 2 is an top elevational view showing the bracket illustrated in FIG. 1, wherein the mounting plates are arranged in planes parallel to one another.
Figure 4:
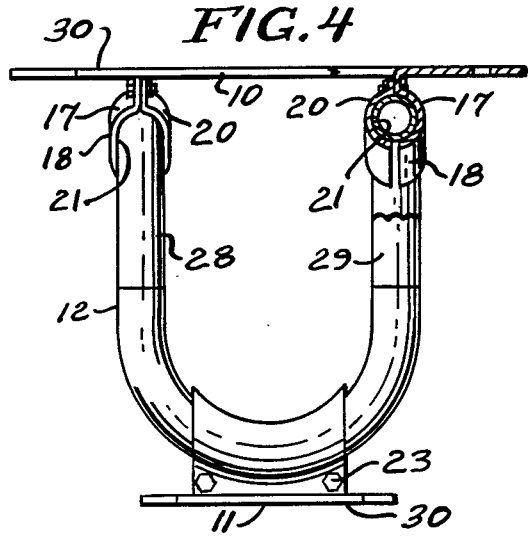
FIG. 4 is a broken away view taken on line 4—4 of FIG. 2.
Figure 3:
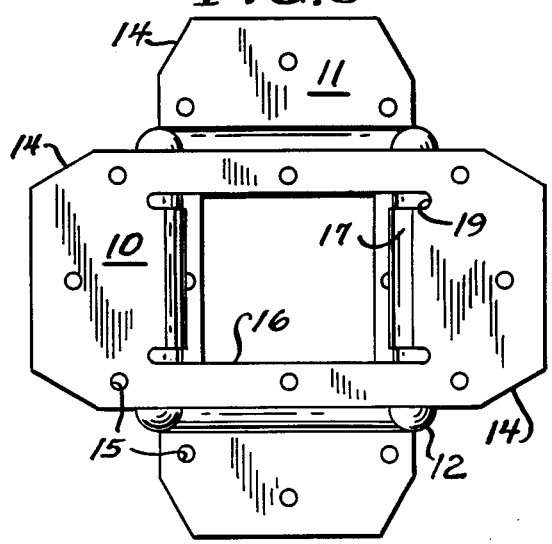
FIG. 3 is a bottom elevational view of the bracket illustrated in FIG. 2.
Figure 5:
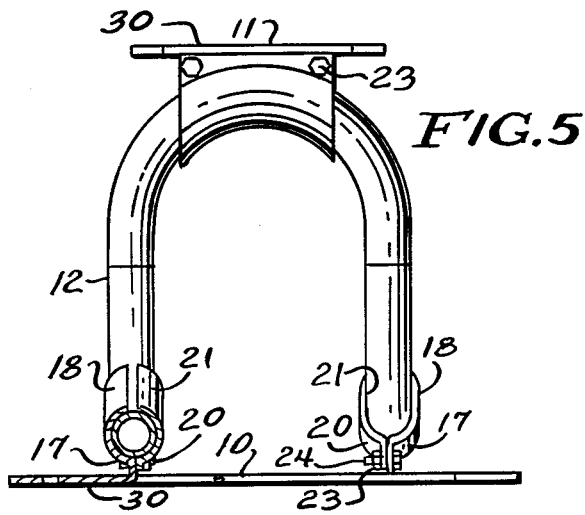
FIG. 5 is a broken away view taken on line 5—5 of FIG. 2.
Figure 6:
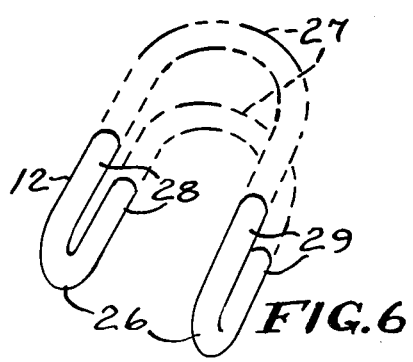
FIG. 6 is a perspective view of the novel articulating member for connecting the mounting plates together.

With reference to the accompanying drawings, the mounting bracket embodying the present invention comprises two like mounting plates 10 and 11, and a U-shaped tubular element 12 arranged between them.

Each mounting plate 10, 11 may be generally rectangular in shape with truncated corners 14 (arranged to fit snugly in a corner of adjacent walls), and each has spaced apart apertures 15 adapted to accommodate fasteners, such as screws, through the plate. Centrally of each plate 10, 11 is an aperture 16, parallel sides of which have opposed upturned flanges 17, each flange having formed therein an arcuate track 18 for a purpose hereafter described. Adjacent each flange 17 in the aperture 16, there is formed a notch 19, and wires (not shown) from a television set, video camera, speaker, or the like, secured to plate 10 or 11 may be threaded through the aperture 16 and held in place in a notch 19 (into which a strain relief bushing or the like (also not shown) may be inserted.

A clamp bracket 20 having an arcuate track 21 like the track 18 in flanges 17 may be aligned with and secured to the flanges 17 by means of a nut 23 and bolt 24. A U-shaped member 12, preferably fabricated from steel tubular or rod material, is sized and shaped to fit into the tracks 18 and 21; and when the nut 23 and bolt 24 is loosened, the U-shaped member may be articulated therein, but when the nut 23 and bolt 24 are tightened, the U-shaped member 12 is secured in a selected positioned.

This U-shaped member 12 preferably has two sets of parallel arcuate members 26 and 27, and two sets of parallel straight members 28 and 29. These double sets of parallel arcuate and straight members 26-29 provide smooth and accurate tilting of one plate 10 relative to the other plate 11 and also provided reinforced connection of the plates together.

A mounting bracket embodying the present invention is versatile, in that its adjustability has a minimum radial arc of 60 degrees. The structure is simple to manufacture, in that it is composed of two like mounting plates 10 and 11 and a single U-shaped connecting element 12. The installer may secure one mounting plate 10 or 11 to the wall or ceiling and the other mounting plate to a speaker or other appliance, without attention to whichever plate is used, each plate having a flat surface 30 for bearing against its respective device, and such mounting orients the flanges 17 in position for installing the U-shaped connecting member 12 in the tracks 18 and 21 for tightening of the flanges 17 and clamps 20 around the arcuate members 26 and 27 in a selected position.

The dual bearing members 28 and 29 of U-shaped connecting member 12 provide extra strength for carrying the appliance on the mounting surface. When mounted on a wall, preferably the plate 10 or 11 attached to the wall is arranged with its longest dimension in a vertical position, so tat it can be attached to a stud for maximum bearing strength.

When mounted on a wall, the tiltable mounting bracket embodying the present invention may be adjusted into any desired position by loosening the bolts 23 and nuts 24 to permit arcuate movement of one plate 10 relative to the other plate 11 as desired, and once in the adjusted selected position, the nuts and bolts are re-tightened.

While a preferred embodiment of the invention has been described in considerable detail, it should be understood that many changes may be made in the embodiment described without departing from the spirit or scope of the invention. Accordingly, it is not desired that the invention should be limited to the exact construction shown and described.

I claim:

1. A tiltable mounting bracket for adjustably securing an appliance to a surface, said bracket comprising a first plate adapted for securing said bracket to said surface, a second plated adapted for attachment of said appliance on to said bracket, and a U-shaped member having a tubular cross-section connected to and arranged for selected movable securement between said plates, said plates and said U-shaped member having cooperative arcuate means for adjustably tilting one plate relative to the other plate both in vertical and horizontal direction and wherein one plate may be disposed angularly to the other plate.

2. The tiltable mounting bracket recited in claim 1, wherein each of said plates is substantially identical.

3. The tiltable mounting bracket recited in claim 2, wherein each plate is generally rectangular in shape and has one dimension longer than its other dimension.

4. The tiltable mounting bracket recited in claim 3, wherein each plate has truncated corners.

5. The tiltable mounting bracket recited in claim 1, wherein said plates are apertured centrally therethrough.

6. The tiltable mounting bracket recited in claim 5, wherein each of said plates has a flange arranged toward said U-shaped member.

7. The tiltable mounting bracket recited in claim 6, wherein each of said plates has a notch adjacent each flange opening into said aperture for accommodating wires passing through said plate.

8. The tiltable mounting bracket recited in claim 5, wherein each of said plates has a plurality of spaced apart mounting holes arranged around said aperture adapted for securing said plate to said surface and said appliance.

9. The tiltable mounting bracket recited in claim 1, wherein said U-shaped member comprises a endless member having parallel sets of arcuate and straight legs horizontally and vertically.

10. A tiltable mounting bracket for adjustably securing an appliance to a surface, said bracket comprising a first plate adapted for securing said bracket to said surface, a second plate adapted for attachment of said appliance on to said bracket, and a U-shaped member connected to and arranged for selective movable securement between said plates, said plates having means for adjustably tilting one plate relative to the other plate both in vertical and horizontal directions, said U-shaped member having a first pair of parallel arcuate legs secured to one of said plates.

11. The tiltable mounting bracket recited in claim 10, wherein said U-shaped member has a second pair of parallel arcuate legs secured to the other of said plates.

12. The tiltable mounting bracket recited in claim 10, wherein said U-shaped member has straight legs arranged between said arcuate legs.

13. The tiltable mounting bracket recited in claim 10, wherein each of said plates has a flat surface its one side arranged in a direction opposed to said U-shaped member.

14. The tiltable mounting bracket recited in claim 13, wherein each of said places has parallel flanges secured to said U-shaped member.

15. A tiltable mounting bracket for adjustably securing an appliance to a surface, said bracket comprising a first plate adapted for securing said bracket to said surface, a second plate adapted for attachment of said appliance on to said bracket, and a U-shaped member connected to and arranged for selective movable securement between said plates, said plates having means for adjustably tilting one plate relative to the other plate both in vertical and horizontal directions, each of said plates having arranged thereon a track removably securing said U-shaped member therein.

16. The tiltable mounting bracket recited in claim 15, wherein said track and said U-shaped member have cooperating arcuate surfaces.

17. The tiltable mounting bracket recited in claim 16, wherein said cooperating arcuate surface on said plate comprises an arcuate surface integral with said plate and a removably secured clamp having an arcuate surface aligned with said plate arcuate surface adapted for releasable securement over said U-shaped member arcuate surface.

18. The tiltable mounting bracket recited in claim 17, wherein said U-shaped member is slidable in said track when said clamp is released, and fixed in said track when said clamp is secured.

* * * * *